United States Patent
Droz et al.

(10) Patent No.: US 7,088,721 B1
(45) Date of Patent: Aug. 8, 2006

(54) METHOD AND APPARATUS FOR MULTIPOINT-TO-POINT TRANSMISSION IN AN ATM NETWORK

(75) Inventors: Patrick Droz, Glattbrugg (CH); Ilias Iliadis, Rüschlikon (CH); Gilad Goren, Ephraim (IL); Kashipati G. Rao, Plano, TX (US); Atiya Suhail, Richardson, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/463,002

(22) PCT Filed: Jul. 17, 1997

(86) PCT No.: PCT/IB97/00893

§ 371 (c)(1),
(2), (4) Date: May 12, 2000

(87) PCT Pub. No.: WO99/04595

PCT Pub. Date: Jan. 28, 1999

(51) Int. Cl.
*H04L 12/28* (2006.01)
*H04L 12/56* (2006.01)

(52) U.S. Cl. .................. 370/395.1; 370/395.2; 370/395.21; 370/395.3; 370/395.31; 370/395.32; 370/389

(58) Field of Classification Search ............. 370/389, 370/392, 409, 537, 538, 540, 396, 397, 398, 370/395, 395.2, 395.21, 395.3, 395.31, 395.32, 370/253, 351, 360, 432, 471, 395.1; 709/243, 709/246

See application file for complete search history.

(56) References Cited

U.S. PATENT DOCUMENTS

| | | | | |
|---|---|---|---|---|
| 5,440,547 A | | 8/1995 | Easki et al. .................. 370/60 |
| 5,579,480 A | * | 11/1996 | Cidon et al. ................ 709/243 |
| 5,666,361 A | * | 9/1997 | Aznar et al. ................ 370/392 |
| 6,333,932 B1 | * | 12/2001 | Kobayasi et al. ........... 370/389 |

FOREIGN PATENT DOCUMENTS

GB   2269724   2/1994

OTHER PUBLICATIONS

Boudec et al., "Connectionless Data Service in an ATM-Based Customer Premises Network", Computer Networks and ISDN Systems, vol. 26, No. 11 Aug. 1, 1994, pp. 1409-1424.
Lutas et al., "Multiprocessor System for Interconnection of Ethernet and FDDI Networks using ATM Via Satellite", IEEE Proceedings: Computers and Digital Techniques, vol. 143, No. 1, Jan. 1, 1996, pp. 69-78.

* cited by examiner

*Primary Examiner*—Huy D. Vu
*Assistant Examiner*—Chuong Ho
(74) *Attorney, Agent, or Firm*—VanLeeuwen & VanLeeuwen; Joscelyn G. Cockburn

(57) ABSTRACT

A method is described for sending frames of data from at least two sending nodes via one or more forwarding nodes to one receiving node in an ATM network. Each frame of data is partitioned into cells and includes a VPI field and a VCI field. The sending nodes include a first label into the VPI field of each of the cells representing an identification of the routing of the cell. Furthermore, the sending nodes include a second label into the VCI field of each of the cells representing an identification of the source of the cell. The forwarding node swaps the first and the second label according to a swapping table. With respect to the second label, the forwarding node enters the swapping table in the column of the output labels and reads the corresponding input label.

9 Claims, 9 Drawing Sheets

METHOD AND APPARATUS FOR MULTIPOINT-TO-POINT TRANSMISSION IN AN ATM NETWORK

The invention relates to a method and an apparatus for sending frames of data from at least two sending nodes via one or more forwarding nodes to one receiving node in an ATM network wherein each frame of data is partitioned into cells.

ATM (asynchronous transfer mode) networks are well known and wide-spread over the world. In an ATM network, the data to be transferred is put together in a frame which consists of a number of cells. The number of the cells depends on the amount of data to be transferred. Each of the cells includes 48 bytes data information and 5 bytes control information. The control information carries all necessary information for transferring the cell from its source to a desired destination. The control information includes a VPI (virtual path identifier) field and a VCI (virtual channel identifier) field.

The cells are sent from the sending or source node via a number of nodes to the receiving or destination node. Usually, the VPI field identifies the desired path of the data. This is accomplished by labels which are written into the VPI field and which are swapped by each node. The swapping is based on swapping tables which are created by a resource manager during the establishment of a new path or during the introduction of a new node and which are present in each node. Such a swapping table includes the label of the incoming VFI field, a new label for the outgoing VPI field and the respective input and output port.

When a cell arrives at an input port of a node, the label of the VPI field of the incoming cell is read and searched for in the swapping table of the node. Then, the corresponding label for the VPI field of the outgoing cell is read from the swapping table and is written into the VPI field of the outgoing cell. And then, the cell is sent to the respective output port of the node which is mentioned in the swapping table.

The connection between a source and a destination is called a point-to-point connection. There is only one path without any spreading or merging of other paths. As mentioned, any such point-to-point connection is carried out by swapping the label of the VPI field in each node.

Another possibility is a point-to-multipoint connection. In this case, one source broadcasts the same data to a number of destinations. For that purpose, the ATM network provides a SETUP message and an ADD PARTY message. With the SETUP message, a point-to-point connection is established. Then, with the ADD PARTY message, it is possible to add further destinations to this point-to-point connection and to thereby build up the point-to-multipoint connection. As there is only one single source, no problem arises in the destinations to combine the frame originally sent from this single source out of the received cells.

It is also possible to reverse the point-to-multipoint connection into a multipoint-to-point connection. For this purpose, a reverse flag may be included in the SETUP message and in the ADD PARTY message.

Such a multipoint-to-point connection includes at least two sending nodes which are followed by forwarding nodes and only one receiving node. Thereby, the data to be transferred is merged together from the number of sources to the single destination. This has the consequence that cells from different sources may be interleaved when they are merged together. The cells arriving at the single destination are therefore mixed with respect to their different sources and have to be reassembled appropriately. Therefore, a mechanism is needed to reassemble the cells from the different sources correctly in the single destination.

A first mechanism is that each forwarding node collects all cells that arrive on a specific input port until the node has collected all cells of one and the same frame. Then, these collected cells are forwarded to the next downstream node continuously, i.e. no other cells from other sources are interleaved. Using this mechanism, the cells are not mixed and it is possible to reassemble the frames sent by the different sources as these frames arrive continuously at the single destination. However, this mechanism has the disadvantage that it introduces a significant delay in the transfer of the data. As well, this mechanism requires additional memory in the forwarding nodes.

In another mechanism, the VCI field of a cell is used to identify the particular source of the cell. Each source is assigned with a globally unique value which is then included by the source in the VCI field of each cell to be sent by the source. Due to the unique configuration, all cells arriving at a destination and having an identical value may then be reassembled into the same frame. This mechanism does not introduce a delay but it requires a globally unique assignment of values for the VCI field which is practically very difficult to guarantee.

It is therefore an object of the invention to provide a method and an apparatus for a multipoint-to-point connection to reassemble the cells from the different sources effectively in the single destination.

In a method as described above, the invention solves this object by the steps of: the sending nodes include a first label into each of the cells representing an identification of the routing or the cell, the sending nodes include a second label into each of the cells representing an identification of the source of the cell, the forwarding node swaps the first and the second label according to a swapping table.

The first label is responsive for the routing of the cell, i.e. the cell finds its path to the desired destination with the help of the first label. Additionally, the second label carries the identification of the source from which the cell comes from. Both cells are swapped in each node with the result that, at the destination, the cell still includes these two labels. The first label has done its duty as the cell has arrived at the desired destination. However, the second label still carries the identification of the source of the cell so that the destination is now able to check from where the cell is coming.

If, in a multipoint-to-point connection, a number of cells of different frames from different sources interleave in merging nodes inbetween the sources and the single destination, the destination is able to differentiate the cells with respect to their different sources with the help of the second label. Therefore, the destination is able to reassemble the cells of the different frames correctly.

The described method according to the invention does not need any additional memory in the forwarding nodes. As well, there is no delay in the forwarding nodes. And it is also not necessary to create globally unique identifications for the nodes. It is sufficient to include the second label in the cells and to swap this second label in the forwarding nodes. Then, the destination is able to differentiate the cells of the different sources with the help of this second label.

In an advantageous embodiment of the invention, the forwarding node swaps the first and the second label according to the same swapping table. As a result, it is not necessary to create an additional swapping table for the second label. Instead, the first and the second label use the same swapping table which has to be created for the first label.

In another advantageous embodiment of the invention, the forwarding node swaps the first label in a forward direction and the second label in a backward direction. By swapping the second label in a backward direction, a simulation is executed in which a simulated cell is transferred from the actual destination to the actual source. If the actual cell arrives at the actual destination, the simulated cell arrives at the source. As a consequence, the second label of the actual cell carries the identification of the source when the actual cell arrives at the destination. As already described, the destination is then able to check from where the cell is coming from with the help of the second label.

In another advantageous embodiment of the invention, with respect of the second label, the forwarding node enters the swapping table in the column of the output labels and reads the corresponding input label. Usually, the swapping table is entered in a forward direction, i.e. it is entered in the column of the input labels and the corresponding output label is read out. This is valid for the first label. However, as already described, the second label is swapped in a backward direction. This means that the swapping table is entered in the column of the output labels and the corresponding input label is read out. By using this backward swapping in connection with the second label, the above described simulation is carried out. Due to the backward swapping, the simulated cell is transferred from the actual destination to the actual source with the result that the second label carries the identification of the source when the actual cell arrives at the destination.

In another advantageous embodiment of the invention, the swapping of the second label is carried out for the same ports of the respective forwarding node as for the first label. In particular in a multipoint-to-point connection, it is possible that the swapping table includes several identical labels in the column of the output labels. In order to enter the correct label of the column of the output labels, the used ports of the respective rode are checked. These ports may also be included in the swapping table or may be stored in any other manner. It is then checked which ports of the respective node belong to the first label, i.e. on which port the cell came in and on which port the cell will leave the node. Then, the column of the output labels is checked for that output label which belongs to the same port connection. Finally, this output label is entered and the corresponding input label is read out of the swapping table in the described backward direction.

In another advantageous embodiment of the invention, the first label is written in and read from the VPI field of the respective cell and the second label is written in and read from the VCI field of the respective cell. In other words, the VPI field is used as usual for the first label and the VCI field is used to carry the second label. As a result, no additional fields or the like are necessary to carry the second label.

Further advantages of the invention become apparent from the following description of an embodiment of the invention which is shown in the figures of the drawing.

Figure 1A:
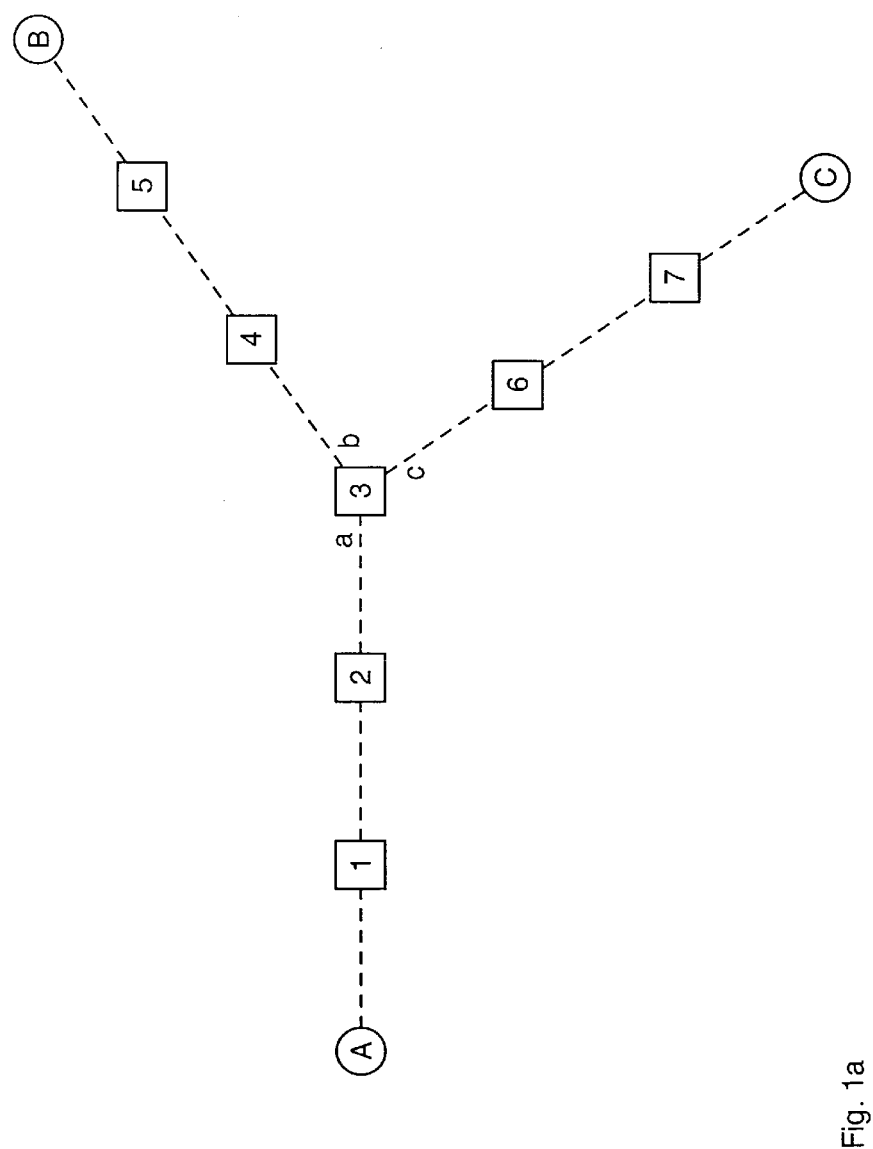
FIGS. 1a to 1h show schematic diagrams of an ATM network with ten nodes.

FIG. 1a shows an ATM network with three nodes A, B, C which are connected via seven further nodes 1, 2, 3, 4, 5, 6, 7. Nodes A, B, C act as sources/destinations, respectively, by being a sender of data or by being a receiver of data. Nodes 1, 2, 3, 4, 5, 6, 7 act as forwarding nodes.

The nodes 1, 2, 4, 5, 6, 7 of FIG. 1a have only two ports, respectively. Therefore, for the purpose of simplicity, the ports are not identified. It is assumed that the nodes 1, 2, 4, 5, 6, 7 forward the received data to the respective next node in each direction. Of course, it is possible that the nodes 1, 2, 4, 5, 6, 7 have more than two ports which then would have to be identified and managed as described in connection with node 3.

Node 3 is a merging point and has three ports a, b, c.

The data transferred on the ATM network of FIG. 1a is partitioned into frames, i.e. all data to be transferred from a source to a destination is included in one frame. The protocol for these transfers is e.g. the Internet Protocol IP.

Each frame consists of a number of cells. The data to be transferred is partitioned into these cells. Each cell carries 48 bytes data information and 5 bytes control information. The control information includes a virtual path identifier VPI field which identifies in particular the destination to which the data has to be transferred. Furthermore, the control information includes a virtual channel identifier VCI field.

Figure 1B:
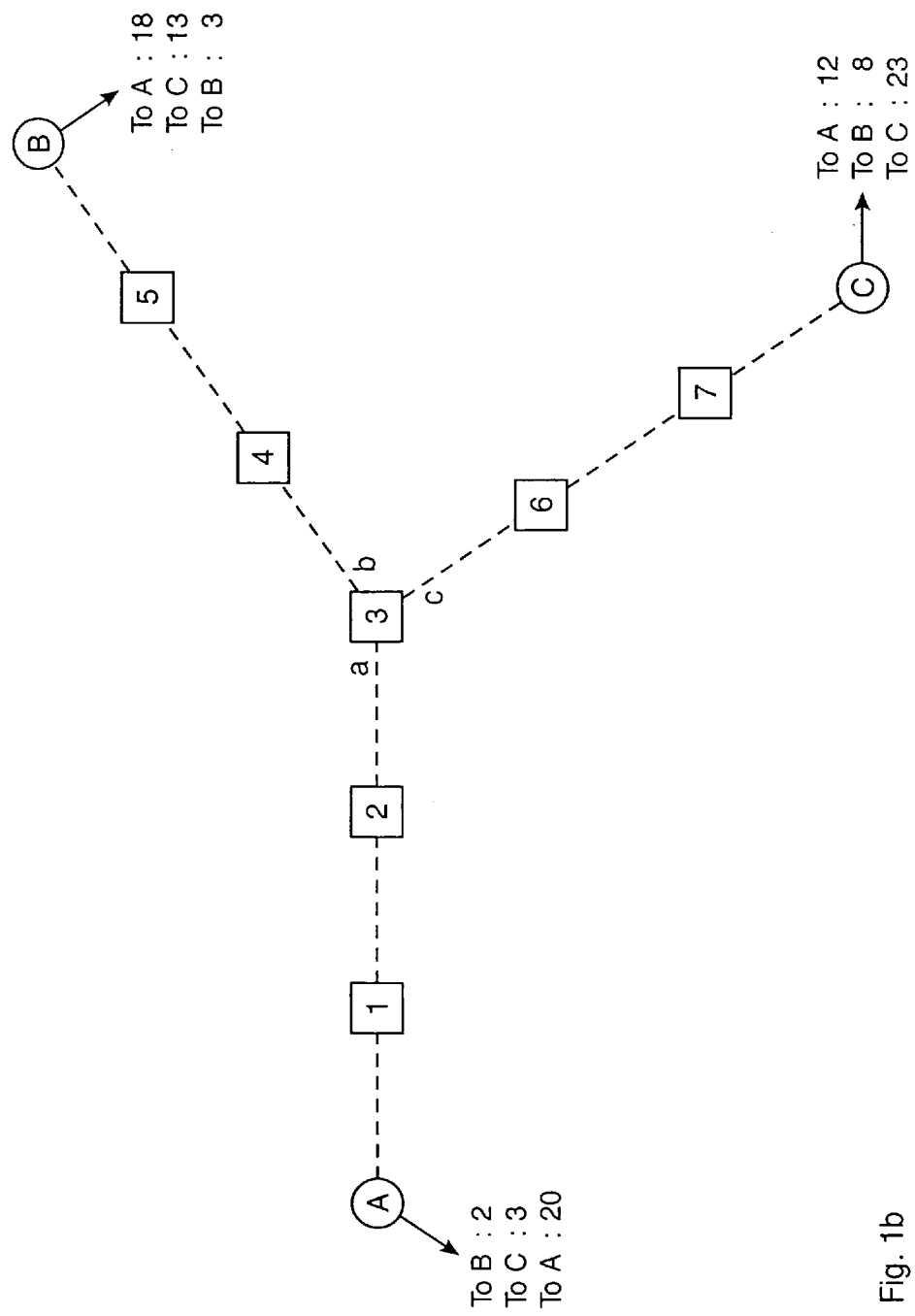

In FIG. 1b, the nodes A, B, C of the ATM network of FIG. 1a are assigned with starting labels. For example, if a cell has to be transferred from node A to node C, the starting label would have to be "3". Or if a cell has to be transferred from node B to node C, the starting label would have to be "13". The starting label to the node itself, i.e. the starting label "23" in node C identifies the node C as such.

Figure 1C:
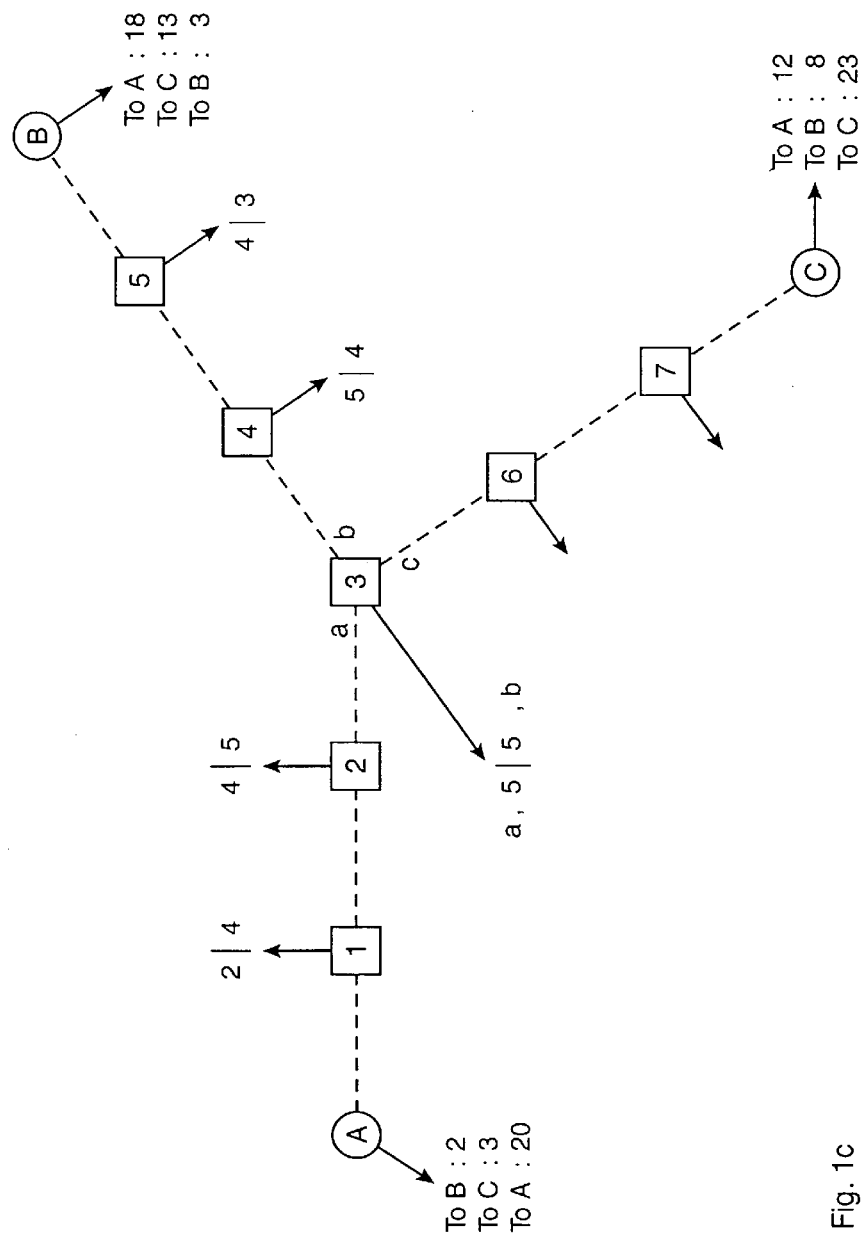

In FIG. 1c, swapping tables are included for each of the nodes 1, 2, 3, 4, 5, 6, 7. As the nodes 1, 2, 4, 5, 6, 7 have only two ports, respectively, no port information is included in the swapping tables of these nodes 1, 2, 4, 5, 6 ,7. These swapping tables, therefore, include in the left column an input label and in the right column a corresponding output label.

As the node 3 has the three ports a, b, c, the swapping table of port 3 includes additional port information. In the left column, the input port and an input label are included and in the right column a corresponding output port and a corresponding output label are included.

These swapping tables are created during the establishment of the ATM network. The swapping tables may be changed when a new node or when a new connection is added. The labels of the swapping tables define the path of a cell from its source to its destination.

The labels are included in the VPI field of a cell. When the cell is transferred from one node to the next node, the output label of the one node is sent to the next node and is received there as the input label. Then, the label is swapped and sent to the next node, etc.

FIG. 1c shows the changes of the labels when a cell is sent from node A to node B. The starting label in node A to node B is "2". In node 1, the input label "2" is swapped to the output label "4". In node 2, the input label "4" is swapped to the output label "5". In node 3, the input port "a" and the input label "5" is swapped to the output label "5" and the output port "b". Then, in node 4, the input label "5" is swapped to the output label "4" and in node 5 to the output label "3". This output label "3" identifies the node B.

Figure 1D:
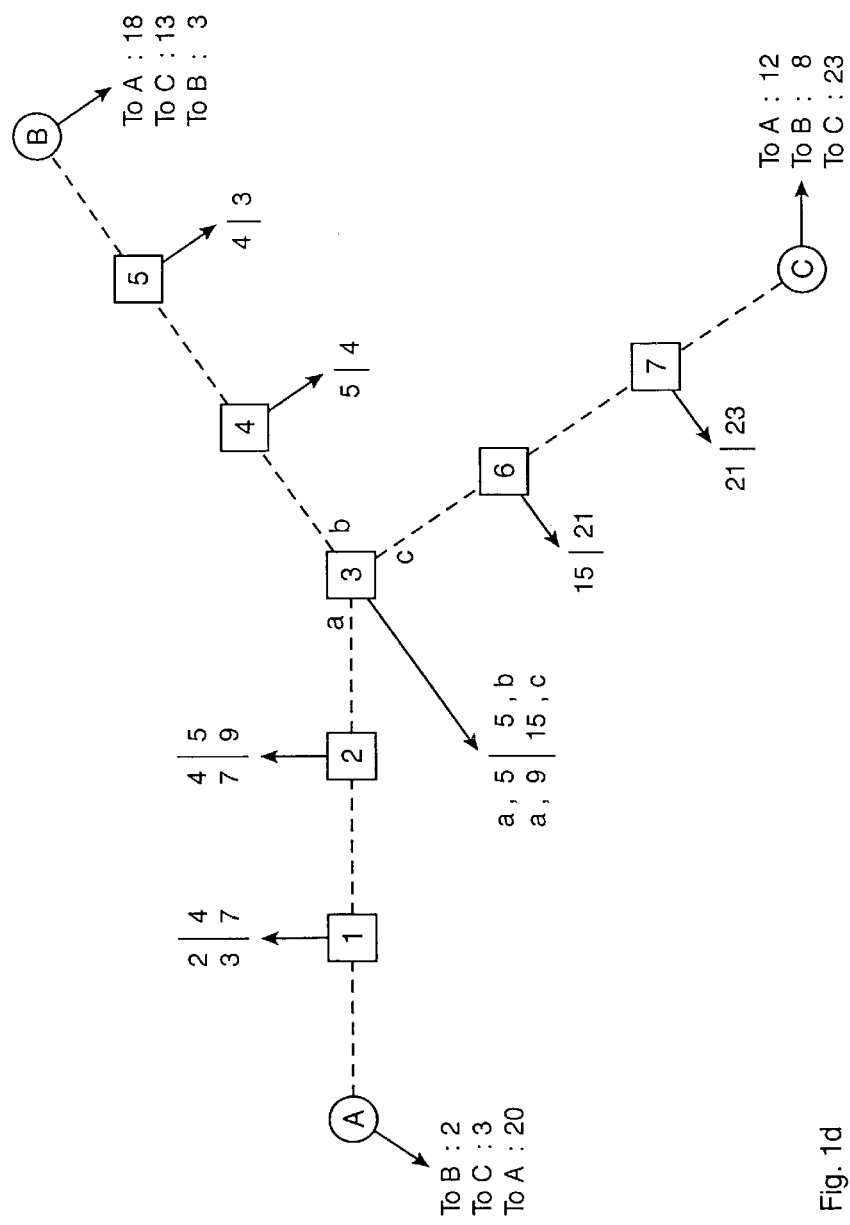
Figure 1E:
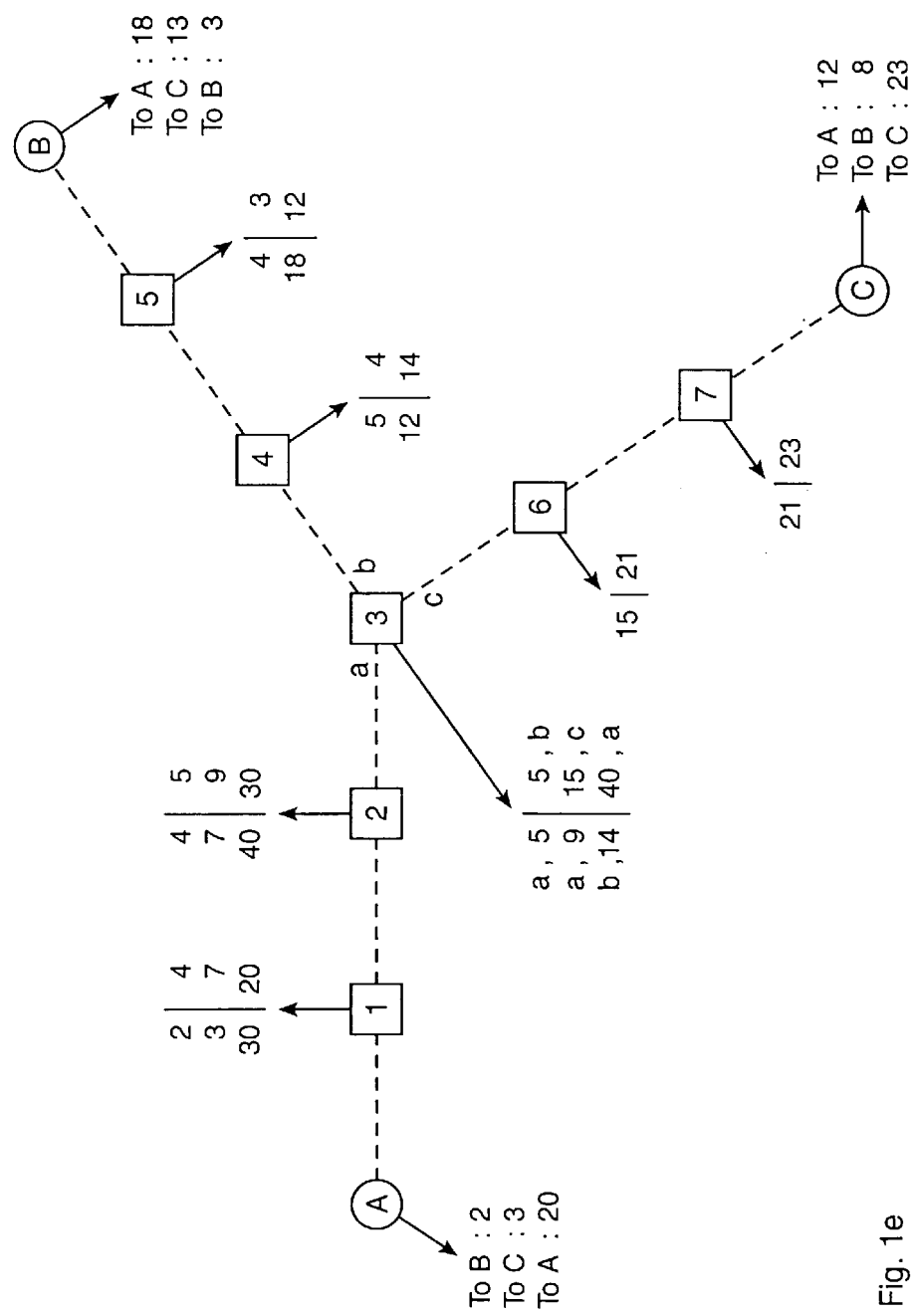
Figure 1F:
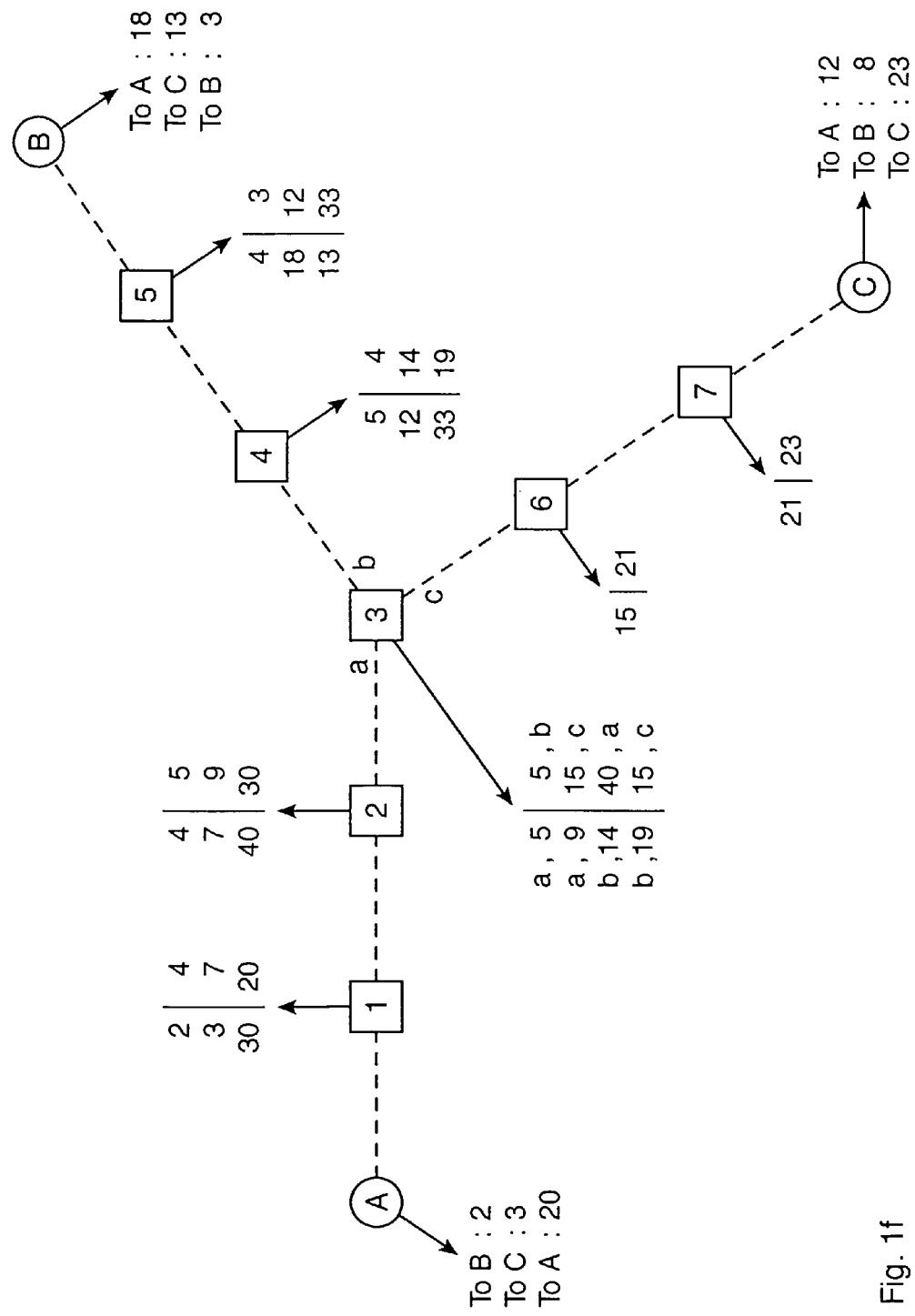
Figure 1G:
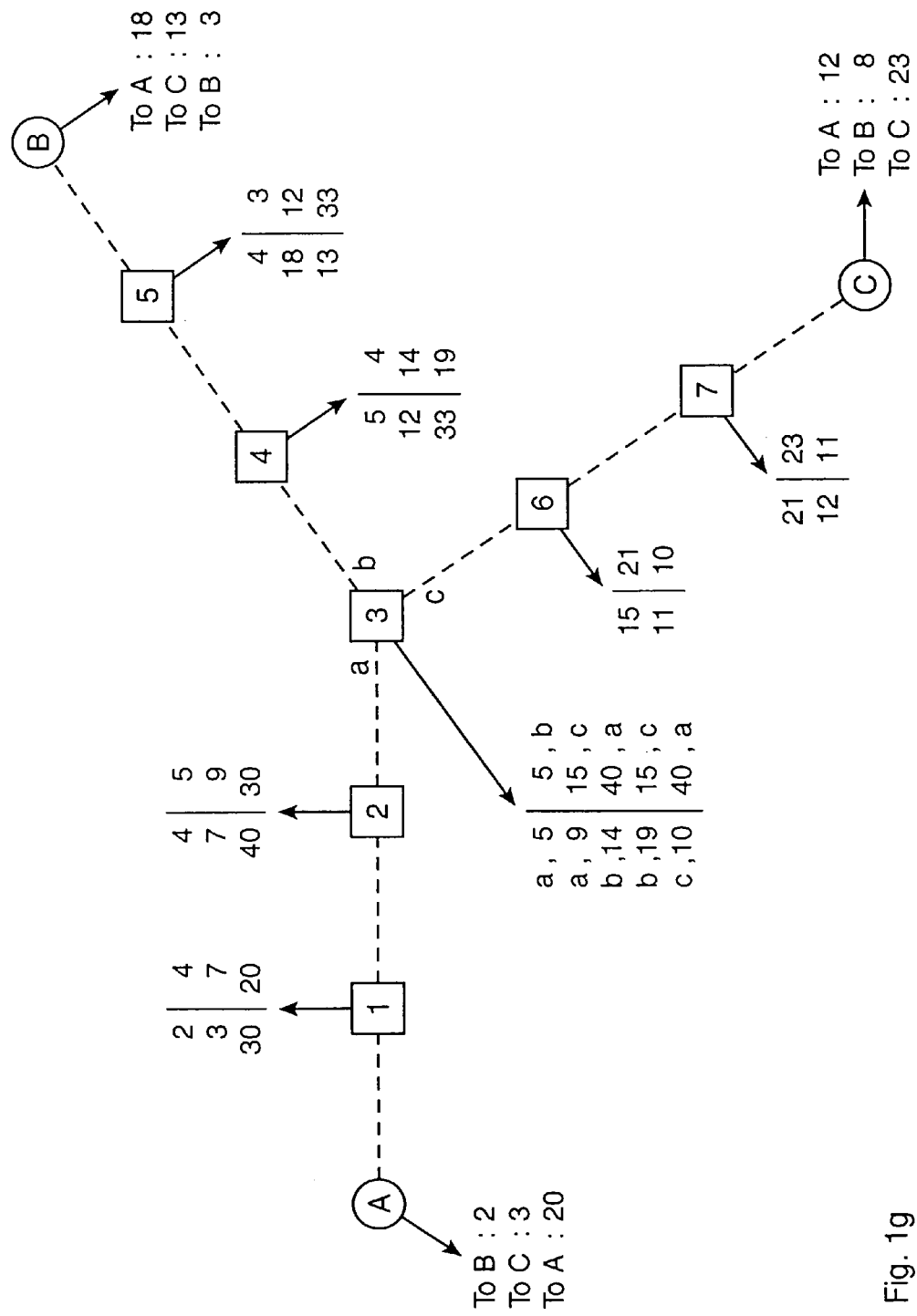
Figure 1H:
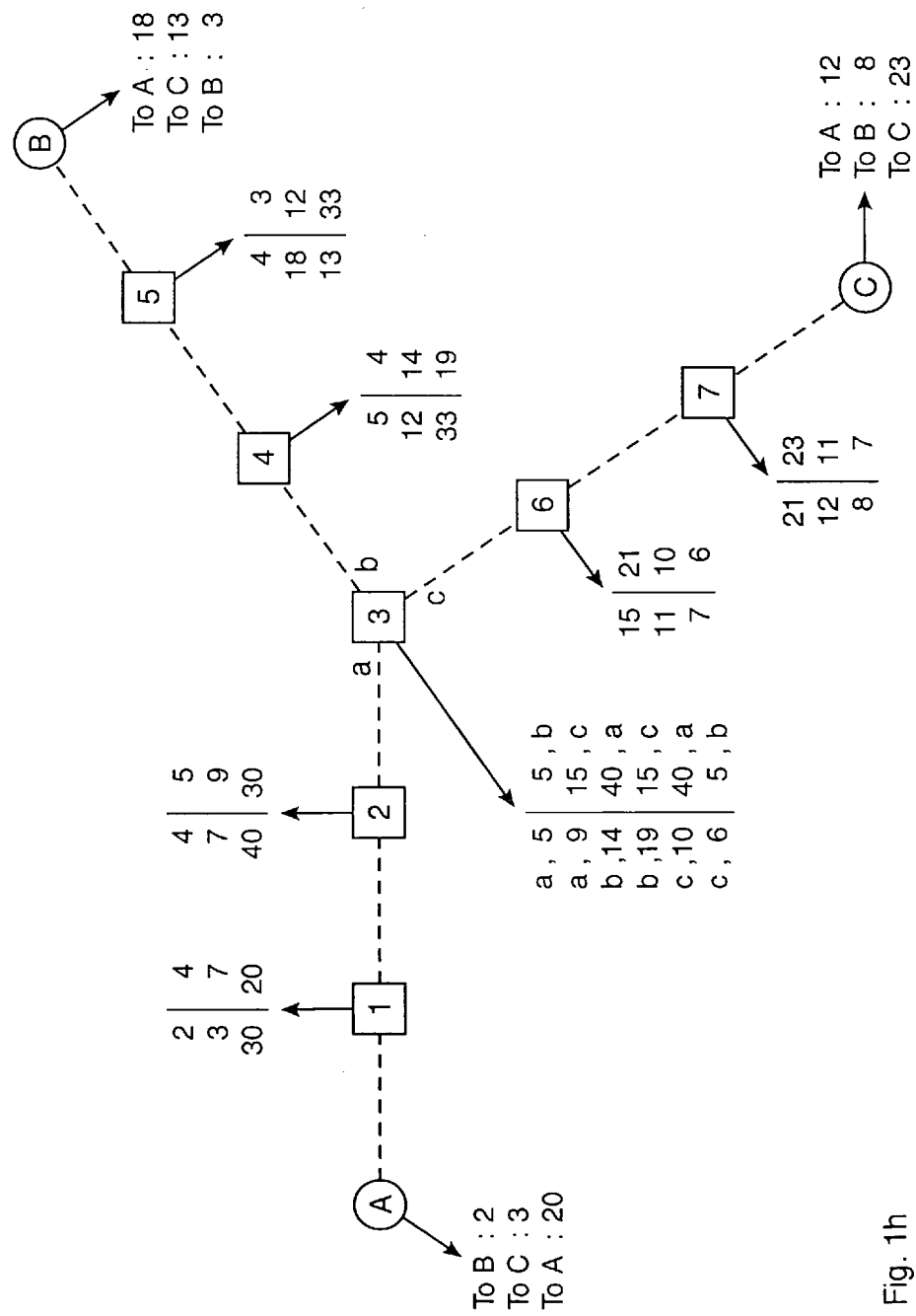

FIG. 1d shows the changes of the labels when a cell is sent from node A to node C. FIG. 1e shows the changes of the labels when a cell is sent from node B to node A. FIG. 1f shows the changes of the labels when a cell is sent from node B to node C. FIG. 1g shows the changes of the labels when a cell is sent from node C to node A. FIG. 1*h* shows the changes of the labels when a cell is sent from node C to node B.

It is assumed that a multipoint-to-point connection from node A and node B to node C is established in the ATM network of FIG. 1*h*.

With respect to a first cell of a first frame of data starting from node A and running to node C, the labels of this first cell are swapped as follows:

| | |
|---|---|
| A –> C: | 3 –> node 1 –> 7 –> node 2 –> 9 –> node 3 –> 15 –> node 6 –> 21 –> node 7 –> 23. |

With respect to a second cell of a second frame of data starting from node B and running to node C, the labels of this second cell are swapped as follows:

| | |
|---|---|
| B –> C: | 13 –> node 5 –> 33 –> node 4 –> 19 –> node 3 –> 15 –> node 6 –> 21 –> node 7 –> 23. |

As a consequence, all incoming cells in node C have the label "23". Therefore, it is not possible to differentiate whether the received cells belong to the first or the second frame, i.e. from which source the cells come from. If the cells of the first and the second frame from node A and node B are interleaved in the merging node 3, then it is not possible to reassemble the correct first and second frame in the receiving node C.

According to the invention, a second label is included additionally in the cell to be transferred. This label identifies the source of the respective cell. The label is included in the VCI field of the cell.

In the above example or a multipoint-to-point connection from node A and node B to node C, the first label is included in the VPI field as described. Furthermore, the identification of the sending node is included as the second label. This second label is then swapped according to the swapping tables in the nodes, however, in a backward direction. This means that the respective swapping table is entered in the column of the output label and the corresponding input label is read out.

With respect to a first cell of a first frame of data starting from node A and running to node C, the labels of this first cell are swapped as follows:

| | |
|---|---|
| A –> C: | 3/20 –> node 1 –> 7/30 –> node 2 –> 9/40 –> . . . , wherein the first figure relates to the first label and the second figure relates to the second label. |

For example, the swapping table of node 2 is entered with the first label in the VPI field in a usual forward direction so that the first label changes from "7" to "9". In the same node 2, the swapping table is entered with respect to the second label of the VCI field in a backward direction, i.e. from the output label to the input label. This results in a change of the second label from "30" to "40".

In node 3, the swapping table includes e.g. two output labels "5" in the backward direction with respect to the second label so that it would not be clear which input label is correct. In this case, the information about the input port and the output port has to be used. In particular, that output label has to be used which relates to the same input/output port connection as the first label.

In the above example, the first label "9" would be swapped according to the swapping table of node 3 to the label "15". Furthermore, the swapping table of node 3 includes the information that the input port a and the output port c belong to this swapping of the first label. The second label "40" exists twice as an output label in the swapping table of node 3. However, only one of these two output labels belongs to the input/output port connection from port a to port c. This output label is selected and, in a backward direction, the corresponding input label is read which is "10".

As a result, the labels of the above mentioned first cell starting from node A and running to node C are swapped as follows:

| | |
|---|---|
| A –> C: | 3/20 –> node 1 –> 7/30 –> node 2 –> 9/40 –> node 3 –> 15/10 –> node 6 –> 21/11 –> node 7 –> 23/12. |

With respect to a second cell of a second frame of data starting from node B and running to node C, the labels of this second cell are swapped as follows:

| | |
|---|---|
| B –> C: | 13/3 –> node 5 –> 33/4 –> node 4 –> 19/5 –> node 3 –> 15/6 –> node 6 –> 21/7 –> node 7 –> 23/8. |

The cells arriving at node C therefore include either the labels 23/12 or the labels 23/8. The first label "23" is equal for both cells. However, the second label is different. The cells coming from node A carry the second label "12" whereas the cells coming from node B carry the second label "8". The label "12" is the starting label to node A from node C and the label "8" is the starting label to node B from node C.

As a consequence, the node C is able to differentiate the arriving cells with respect to different sources. The cells with the second label "12" belong to the node A and the cells with the second label "8" belong to node B. Interleaved cells may therefore be reassembled correctly with the help of the second label.

The above method is described in connection with a symmetric ATM network. However, the method also applies in the case of an asymmetric ATM network as described now.

Figure 2:
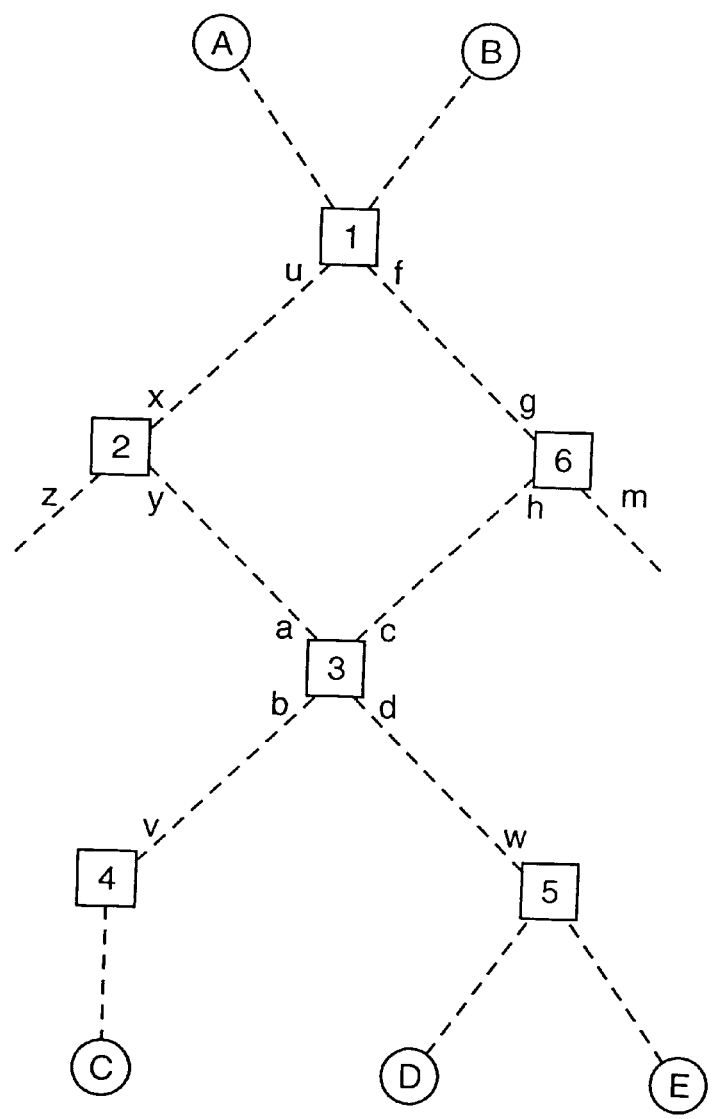
FIG. 2 shows a schematic diagram of another ATM network.

FIG. 2 shows an ATM network with five nodes A, B, C, D, E which are connected via six further nodes 1, 2, 3, 4, 5, 6. Nodes A, B, C, D, E act as sources/destinations, respectively, by being a sender of data or by being a receiver of data. Nodes 1, 2, 3, 4, 5, 6 act as forwarding nodes. Node 1 has two ports u, f, node 2 has three ports x, y, z, node 3 has four ports a, b, c, d, node 4 has one port v, node 5 has one port w and node 6 has three ports g, h, m.

In order to establish the ATM network shown in FIG. 2, the nodes 1, 4, 5 sent establishment messages to their neighbors. These messages include the identification of the respective nodes A, B, C, D, E and a starting label as follows:

| | | |
|---|---|---|
| node 1: | A,1 | B,2 |
| node 4; | C,10 | |
| node 5: | D,1 | E,10. |

When such an establishment message reaches one of the neighbor nodes on one of its ports, this node marks the input port and then generates its own establishment message for the respective node 1, 4, 5 and sends it out on the correct port. This output port is also stored in the node.

It is now assumed that the paths originated by node A and node B reach node 3 via node 6 and the paths destined to node A and node B are routed via node 2.

Then, node 2 forwards the following establishment messages to port y:

| | | |
|---|---|---|
| node 2: | A,10 | B,11. |

Node 3 sends the following establishment messages:

| | | | |
|---|---|---|---|
| node 3: | A,10 | B,21 | to ports b, c, d |
| | C,12 | | to ports a, c, d |
| | D,13 | E,14 | to ports a, b, c. |

And node 6 forwards the following establishment messages to port g and port m:

| | | |
|---|---|---|
| node 6; | C,1 | E,3. |

Now, the swapping tables of node 3, node 2 and node 6 have the following structure wherein the left column includes the input labels, the middle column includes the output labels and the right column includes the output ports:

| | | | | |
|---|---|---|---|---|
| node 3: | 10 | 10 | a | (−>A) |
| | 21 | 11 | a | (−>B) |
| | 12 | 10 | b | (−>C) |
| | 13 | 1 | d | (−>D) |
| | 14 | 10 | d | (−>E) |
| node 2: | 10 | 1 | x | (−>A) |
| | 11 | 2 | x | (−>B) |
| node 6: | 1 | 12 | h | (−>C) |
| | 2 | 13 | h | (−>D) |
| | 3 | 14 | h | (−>E). |

At the nodes 1, 4, 5, the virtual circuits directly go to the IP layer. Therefore, the swapping tables of the nodes 1, 4, 5 have the following structure wherein a hyphen stands for a virtual circuit which starts or ends at the respective node:

| | | | | |
|---|---|---|---|---|
| node 1: | 1 | — | — | (−>A) |
| | 2 | — | — | (−>B) |
| | — | 1 | f | (−>C) |
| | — | 2 | f | (−>D) |
| | — | 3 | f | (−>E) |
| node 4: | — | 10 | v | (−>A) |
| | — | 21 | v | (−>B) |
| | 10 | — | — | (−>C) |

-continued

| | | | | |
|---|---|---|---|---|
| | — | 13 | v | (−>D) |
| | — | 14 | v | (−>E) |
| node 5: | — | 10 | w | (−>A) |
| | — | 21 | w | (−>B) |
| | — | 12 | w | (−>C) |
| | 1 | — | — | (−>D) |
| | 10 | — | — | (−>E). |

When the establishment messages initiated by the nodes A and B reach the nodes 4 and 5, reverse establishment messages are generated as follows:

| | | | |
|---|---|---|---|
| node 4: | rc,10 | | to port v |
| node 5: | rD,1 | rE,10 | to port w. |

Then, node 3 forwards establishment messages on the same port at which the forward establishment messages arrived originally, i.e. on port a, as follows:

| | | | |
|---|---|---|---|
| node 3: | rC,12 | rD,13 | rE,14. |

Finally, node 2 forwards establishment messages on port x as follows:

| | | | |
|---|---|---|---|
| node 2: | rC,41 | rD,42 | rE,43. |

In the same manner, reverse establishment messages are created when the original establishment messages initiated by node C, node D and node E arrive at node 1 as follows:

| | | | |
|---|---|---|---|
| node 1: | rA,1 | rB,2 | to port f. |

Then, node 6 forwards establishment messages as follows:

| | | | |
|---|---|---|---|
| node 6: | rA,10 | rB,52 | to port h. |

This has the result that the swapping tables are expanded as follows:

| | | | | |
|---|---|---|---|---|
| node 3: | 10 | 10 | c | (<−A) |
| | 21 | 52 | c | (<−B) |
| | 12 | 10 | b | (<−>C) |
| | 13 | 1 | d | (<−>D) |
| | 14 | 10 | d | (<−>E) |
| node 2: | 41 | 12 | y | (<−C) |
| | 42 | 13 | y | (<−D) |
| | 43 | 14 | y | (<−E) |
| node 6: | 10 | 1 | g | (<−A) |
| | 52 | 2 | g | (<−B) |
| node 1: | — | 41 | u | (<−C) |
| | — | 42 | u | (<−D) |
| | — | 43 | u | (<−E). |

When a cell is sent from node A to node D, it passes through node 1, node 6, node 3 and node 5. In these nodes 1, 6, 3, 5, the first label included in the VPI field and the second label included in the VCI field of the respective cell are swapped as follows:

| | |
|---|---|
| A -> D: | node 1 -> 2/1 -> node 6 -> 13/10 -> node 3 -> 1/10 -> node 5. |

When at the same time a cell is sent from node C to node D, it passes through node 4, node 3 and node 5. In these nodes 4, 3, 5, the first label and the second label are swapped as follows:

| | |
|---|---|
| C -> D: | node 4 -> 13/10 -> node 3 -> 1/12 -> node 5. |

The first label of the cells coming from node A and node C have the same label "1" when they arrive at node 5. This is the identification of the destination in node 5, i.e. node D. However, the second label of the cells is different. The second label of the cell coming from node A is "10" and the second label of the cell coming from node C is "12". In node 5, the label "10" is the identification of node A and the label "12" is the identification of node C.

Therefore, node 5 is able to differentiate the cells coming from node A and from node C and to reassemble the respective frames correctly.

According to the above examples of ATM networks shown in FIGS. 1*a* to 1*h* and in FIG. 2, the second label relating to the source of the respective cell is written into and read out of the VCI field of the cell. Alternatively, it is also possible to use only a part of the VCI field, in particular one byte of the VCI field, for the second label. As well, it is possible to use two bytes of the 48 bytes of the cell which usually carry the information in order to carry the first and the second labels. This last possibility may be required for very large networks where 16 bits per label are necessary.

According to the above examples, the swapping tables are stored in the nodes. Alternatively, it is also possible to store several swapping tables in the ports of the nodes.

The invention claimed is:

1. Multipoint-to-point transmission method for sending frames of data from a plurality of sending nodes via one or more forwarding nodes to one receiving node in an ATM network wherein each frame of data is partitioned into cells, comprising the steps of:
    one of the plurality of sending nodes includes a first label and a second label into each of the cells, the first label representing an identification of the routing of the cell and the second label representing an identification of the source of the cell;
    the forwarding node swaps both the first label associated with a forward direction and the second label associated with a backward direction using the swapping table; and
    wherein the first label is written in and read from a VPI field of the respective cell and the second label is written in and read from a VCI field of the respective cell.

2. Method according to claim 1, further comprising the step of:
    the forwarding node swaps the first and the second label according to the same swapping table.

3. Method according to claim 1, further comprising the steps of:
    the swapping of the second label is carried out for the same ports of the respective forwarding nodes as for the first label.

4. Apparatus for sending frames of data in a multipoint-to-point fashion from a plurality of sending nodes via one or more forwarding nodes to one receiving node in an ATM network wherein each frame of data is portioned into cells, comprising:
    in one of the plurality of sending nodes, means for including a first label and a second label into each of the cells, the first label representing an identification of the routing of the cell and the second label representing an identification of the source of the cell;
    in the forwarding node, means for swapping both the first label associated with a forward direction and the second label associated with a backward direction using the swapping table;
    in the forwarding node, with respect to the second label, means for entering the swapping table in the column of the output labels and reading the corresponding input label; and
    wherein the first label is written in and read from a VPI field of the respective cell and the second label is written in and read from a VCI field of the respective cell.

5. Apparatus according to claim 4, further comprising:
    in the forwarding node, means for swapping the first and the second label according to the same swapping table.

6. Apparatus according to claim 4, wherein the means for swapping the second label is carried out for the same ports of the respective forwarding node as for the first label.

7. Multipoint-to-point transmission method for sending frames of data from a plurality of sending nodes via one or more forwarding nodes to one receiving node in an ATM network wherein each frame of data is partitioned into cells, comprising the steps of:
    one of the plurality of sending nodes includes a first label and a second label into each of the cells, the first label representing an identification of the routing of the cell and the second label representing an identification of the source of the cell;
    the forwarding node swaps both the first label associated with a forward direction and the second label associated with a backward direction using the swapping table;
    with respect to the second label, the forwarding node enters the swapping table in the column of the output labels and reads the corresponding input label; and
    wherein the first label is written in and read from a VPI field of the respective cell and the second label is written in and read from a VCI field of the respective cell.

8. Method according to claim 7, further comprising the step of:
    the forwarding node swaps the first and the second label according to the same swapping table.

9. Method according to claim 7, further comprising the step of:
    the swapping of the second label is carried out for the same ports of the respective forwarding node as for the first label.

* * * * *

UNITED STATES PATENT AND TRADEMARK OFFICE
CERTIFICATE OF CORRECTION

| | | |
|---|---|---|
| PATENT NO. | : 7,088,721 B1 | Page 1 of 1 |
| APPLICATION NO. | : 09/463002 | |
| DATED | : August 8, 2006 | |
| INVENTOR(S) | : Droz et al. | |

It is certified that error appears in the above-identified patent and that said Letters Patent is hereby corrected as shown below:

Column 3, line 40, please delete "rode" and insert --node--.

Signed and Sealed this

Seventh Day of November, 2006

JON W. DUDAS
*Director of the United States Patent and Trademark Office*